Oct. 17, 1939.  F. H. SCHWERIN  2,176,277
WIRE CABLE CONNECTOR TOOL
Filed May 28, 1938  2 Sheets-Sheet 1

INVENTOR
Frank H. Schwerin
BY J. F. Brandenburg
ATTORNEY

Oct. 17, 1939.                F. H. SCHWERIN                2,176,277
                        WIRE CABLE CONNECTOR TOOL
                          Filed May 28, 1938                2 Sheets-Sheet 2
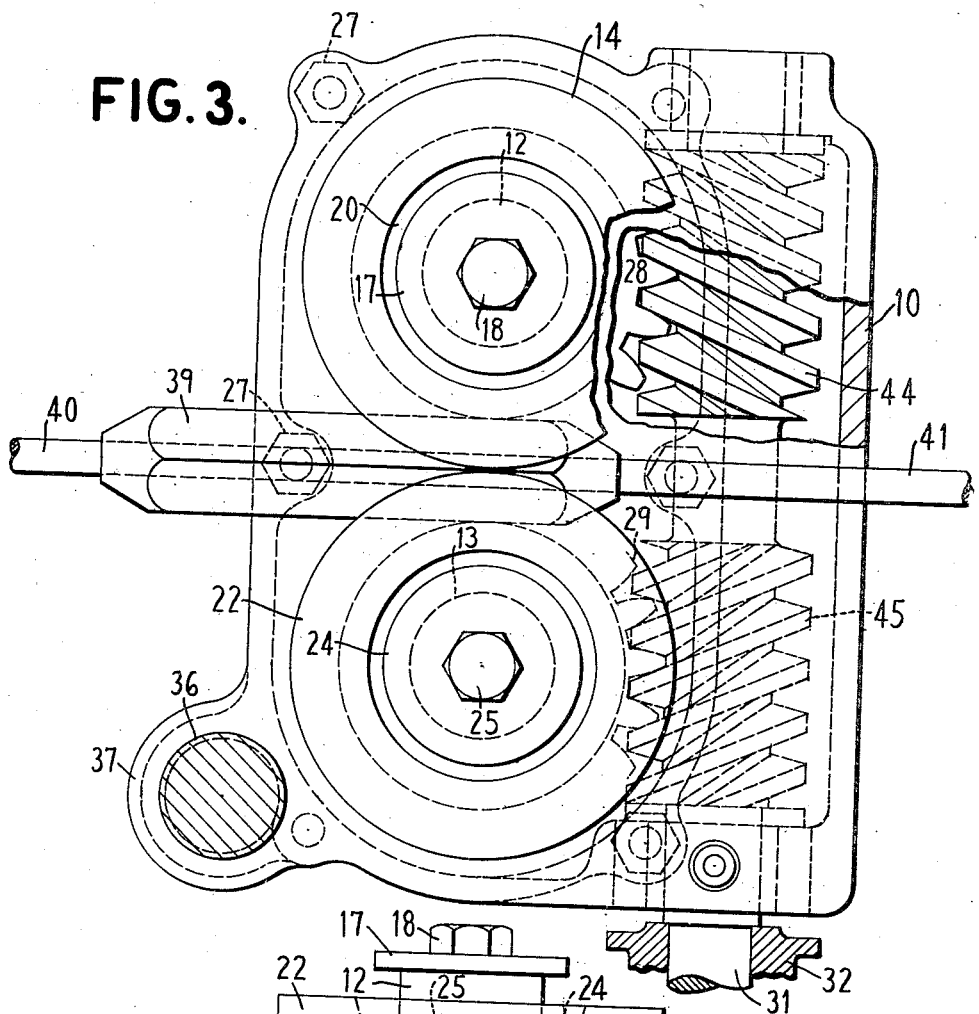
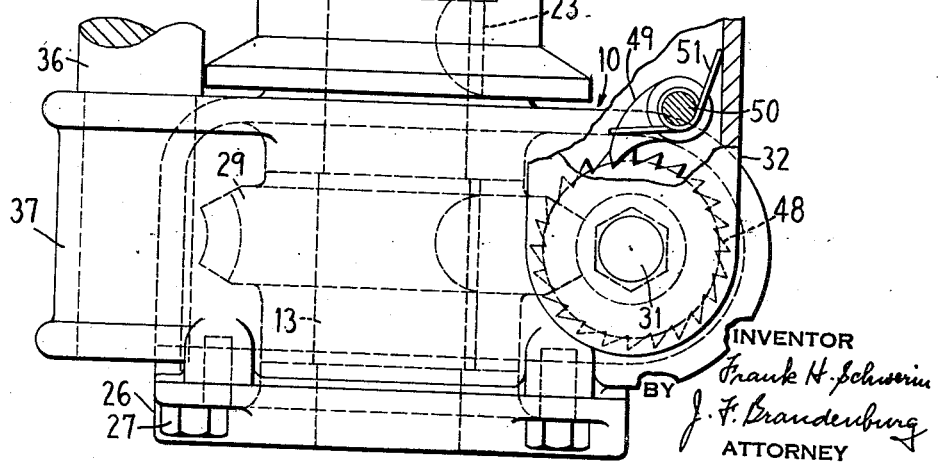
INVENTOR
Frank H. Schwerin
BY
J. F. Brandenburg
ATTORNEY

Patented Oct. 17, 1939

2,176,277

UNITED STATES PATENT OFFICE 2,176,277

WIRE CABLE CONNECTOR TOOL

Frank H. Schwerin, Bellevue, Pa., assignor to The Duff-Norton Manufacturing Company, Pittsburgh, Pa., a corporation of Pennsylvania Application May 28, 1938, Serial No. 210,797

10 Claims. (Cl. 140—113)

This invention relates to tools for making cable joints by placing a connector sleeve over the abutting ends of wires to be joined and then rolling the sleeve to compress it against the ends of the wire and cause the sleeve to permanently grip the wire.

Such joints are made quickly and require no solder. Some connecting sleeves are constructed in such a way that they corrugate the wire within the sleeve when compressed but others leave the wires straight. It is an object of this invention to provide an improved tool or machine for rolling either form of sleeve to make a cable connection of the character indicated.

The invention comprises novel features and combinations of elements that make the tool economical to manufacture and convenient and advantageous in use.

One feature of the invention is the motion transmitting connections through which the handle turns the rollers without slippage to effect a more continuous rolling action and a smooth surface on the joint.

Other objects, features and advantages of the invention will appear or be pointed out as the specification proceeds.

In the accompanying drawings, forming part hereof:

Figs. 3 and 4 are front and side views, respectively, of the tool shown in Fig. 1, a cable joint being shown between the rollers of the tool in Fig. 3.

Figure 1:
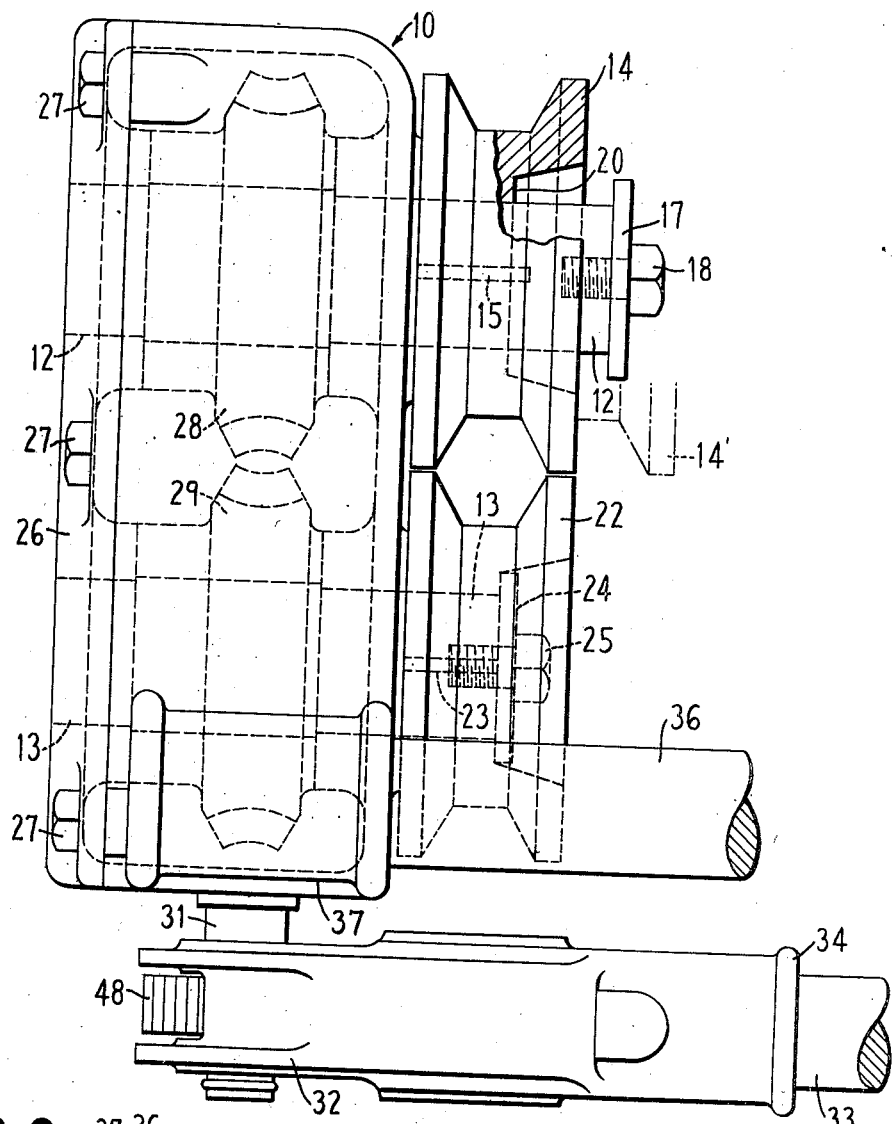
Fig. 1 is a full-size front elevation of a wire cable connector tool embodying the invention.

The illustrated embodiment of the invention includes a frame comprising a housing 10 in which are journaled two shafts 12 and 13. These shafts extend through the front wall of the housing, and the upper shaft 12 is somewhat longer than the lower shaft 13. A roller 14 is connected to the shaft 12 by a key 15, but is free to slide lengthwise of the shaft.

A washer 17 is secured to the end of the shaft 12 by a screw 18 that threads into the shaft, and this washer prevents the roller 14 from sliding off the shaft. The upper part of the roller 14 is broken away in Fig. 1 to show the recessed face 20 which permits the roller 14 to slide on the shaft 12 for a distance almost as great as the width of the roller without having the shaft 12 extend much beyond the front of the roller 14. The position of the roller 14 when moved out against the washer 17 is indicated in dotted lines and marked with the reference character 14' in Fig. 1.

A roller 22 is connected to the shaft 13 by a key 23 and is held against displacement lengthwise of the shaft by a washer 24 which is fastened to the end of the shaft by a screw 25 threaded into the shaft.

The housing 10 is a box-like casting closed at one side by a plate 26 that is attached to the housing by screws 27. The bearings for one end of the shafts 12 and 13 are in the plate 26. Within the housing 10 there are worm wheels 28 and 29 keyed to the shafts 12 and 13, respectively. Since the housing 10 is completely closed by the cover plate 26, the housing can be filled with lubricant for the worm wheels 28 and 29.

A drive shaft 31 is journaled in opposite side walls of the housing 10 and extends from one side of the housing. A ratchet case 32 fits over a hexagonal end of the shaft 31. A handle 33 fits into a socket 34 formed on the ratchet case 32. A second handle 36 fits into a bracket 37 secured to the housing 10.

Figure 2:
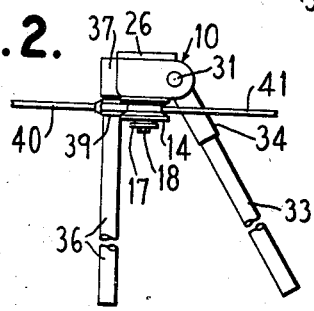
Fig. 2 is a reduced side view illustrating the manner in which the tool of Fig. 1 is used when rolling a cable joint.

Fig. 2 shows the relation of the handles 33 and 36 when the tool is being used to roll a sleeve 39 that joins two wires 40 and 41. The operator supports the tool largely with the handle 36 and causes the rollers to turn, in a manner to be described, by rocking the handle 33 toward and from the fixed handle 36. The tool can be used on wires above, below or on the side of the operator. The handles 33 and 36 are, therefore, made fast in the socket and bracket which connect them with the tool so that the tool cannot slide off when hanging from the handles and in use on a connection below the operator.

Fig. 3 shows two worms 44 and 45 keyed to the shaft 31 inside of the housing 10. The worm 44 has left-hand threads and meshes with the worm wheel 28. The threads of the worm 45 are right-hand, and that worm meshes with the worm wheel 29. Rotation of the shaft 31, therefore, causes the worm wheels 28 and 29 to turn in opposite directions and to turn the rollers 14 and 22 in opposite directions. In the illustrated embodiment of the invention there is a triple thread on each of the worms to effect greater angular movement of the rollers for a given movement of the handle 33.

The pass between the rollers 14 and 22 is slightly less than the cross-section of the connector sleeve 39 so that when the rollers 14 and 22 are brought to the end of the connector sleeve and rotated in a direction to draw the connector sleeve 39 into the roll pass, the rollers will travel along the connector sleeve from one end to the other with a drawing action that causes the connector sleeve strongly to grip the wires 40 and 41 and form a permanent joint.

The rollers 14 and 22 can be replaced with other rollers of different size or different face contour when the tool is to be used with connector sleeves of other sizes or shapes. The ratchet case 32 includes a ratchet 48 with a hexagonal center opening that fits over the end of the shaft 31. A pawl 49, pivoted on a pin 50 within the ratchet case, is held against the ratchet by a spring 51. The ratchet is reversible by removing it from the shaft 31, turning the ratchet case half-way around so that the opposite side of the ratchet is toward the housing 10, and again putting the ratchet on the shaft 31. Other kinds of reversible ratchet cases such as used on socket wrench sets can be used with this invention.

The preferred embodiment of the invention has been illustrated, but changes and modifications can be made and some features of the invention can be used without others.

I claim:

1. A tool for rolling cable joints including in combination a frame, two shafts journaled in the frame with ends extending beyond the frame, a roller on each of said shafts forming a roll pass which has the desired cross-section for the joint on which the tool is to be used, a driving shaft journaled in the frame and extending transversely of the roller shafts, motion transmitting connections between the driving shaft and the roller shafts, and two handles, one connected with the frame and the other with the drive shaft, both of said handles extending at an angle to the plane of rotation of the rollers.

2. In a wire cable connector tool, a pair of rollers forming a roll pass through which a cable connector is passed to bind it to the cables, parallel shafts to which the respective rollers are connected, a worm wheel secured on each shaft, a driving shaft, two worms on the driving shaft, one worm meshing with each of said worm wheels, and two handles on the tool extending at angles to the plane of rotation of the rollers, one of said handles being operatively connected to the drive shaft and movable angularly to impart rotative movement to the drive shaft.

3. A tool for rolling connector sleeves to bind them to cable ends, said tool comprising a housing, two parallel shafts journaled in the housing and having ends extending from the housing, a roller on each of the extending ends of the shafts, said rollers being in relation to cooperate in rolling a connector sleeve, a worm wheel on each shaft inside of said housing, a third shaft journaled in the housing with one end extending from the end of the housing and shaped to connect with an operating handle, and two worms on the third shaft including a worm with a left-hand thread meshing with one worm wheel and a worm with a right-hand thread meshing with the other worm wheel.

4. A tool for rolling connector sleeves to bind them to cable ends, said tool comprising a housing, two parallel shafts journaled in the housing and having ends extending from one side of the housing, a roller on each of the extending ends of the shafts, said rollers being in relation to cooperate in rolling a connector sleeve, a worm wheel on each shaft inside of said housing, a third shaft journaled in the housing with one end extending from the end of the housing and shaped to connect with an operating handle, two worms on the third shaft including a worm with a left-hand thread meshing with one worm wheel and a worm with a right-hand thread meshing with the other worm wheel, and two handles on the tool extending from the side of the tool on which the rollers are located and at angles to the plane of rotation of the rollers, pawl and ratchet mechanism through which one of said handles is connected with the third shaft, and means connecting the other handle to the housing at such a location that the handles are moved toward one another to operate the rollers.

5. In a tool for rolling cable connectors, cooperating rollers with faces shaped to form a roll pass having the desired contour of the connector, and mechanism for turning the rollers in opposite directions including a worm wheel operatively connected with each roller, two multiple-thread worms, one meshing with each of said worm wheels, and apparatus for turning both worms simultaneously, said apparatus including two hand levers that are angularly movable with respect to one another.

6. A tool for rolling cable connections including in combination two rollers forming a pass for the cable connection, mechanism for turning the rollers in opposite directions including a worm wheel connected with each roller and a multiple-thread worm in driving relation with each worm wheel, said worms having right- and left-hand threads, respectively, and means for turning the worms including a handle and a pawl and ratchet mechanism through which angular movement of the handle imparts rotary movement to the worms.

7. In a cable connector rolling tool having cooperating rollers on parallel axles and mechanism for turning said rollers including a shaft extending in a direction transverse of the axles and gearing operatively connecting the axles with the shaft, apparatus for turning the shaft comprising a handle extending at an angle to the plane of rotation of the rollers, and a reversible pawl and ratchet mechanism operatively connecting the handle with the shaft so that said gearing can be rotated in either direction by angular movement of the handle.

8. A tool for rolling wire cable connectors including in combination two rollers that form a pass of a cross-section for rolling a cable connector of a given size, two parallel axles on which the respective rollers turn, one of said rollers having additional movement with respect to the other to admit the cable into the roll pass, a worm wheel operatively connected with each axle, a drive shaft with worms meshing with said worm gears, and a handle for turning the drive shaft.

9. A tool for rolling cable connections including in combination a frame, two parallel shafts extending from the frame, rollers on the respective shafts in relation to form a roll pass for working on a connection, mechanism for rotating the rollers in opposite directions including a shaft extending in a plane parallel to the plane of rotation of the rollers, the end of said shaft being constructed to receive a tool, and a handle-receiving socket on the frame with an axis extending at right angles to the plane of rotation of the rollers.

10. A tool for rolling cable connections including in combination a frame, two parallel shafts extending from the frame, rollers on the respective shafts forming a roll pass, mechanism for turning the rollers in opposite directions including a third shaft that extends in a plane parallel to the plane of rotation of the rollers, and two handles on said tool extending from the same side of the frame and in planes normal to the plane of rotation of the rollers, one of said handles being fixed to the frame and the other being connected with the third shaft and movable to turn said shaft and impart rotary movement to said rollers.

FRANK H. SCHWERIN.